(12) United States Patent
Spitz et al.

(10) Patent No.: US 11,736,347 B2
(45) Date of Patent: Aug. 22, 2023

(54) PROVISIONING CONTROL APPARATUS, SYSTEM AND METHOD

(71) Applicant: Secure Thingz Ltd., Cambridge (GB)

(72) Inventors: Stephan Spitz, Karlsfeld (DE); Andrew Bott, Cambridge (GB); Tim Hoole, Foxton (GB)

(73) Assignee: SECURE THINGZ LTD., Cambridge (GB)

( * ) Notice: Subject to any disclaimer, the term of this patent is extended or adjusted under 35 U.S.C. 154(b) by 127 days.

(21) Appl. No.: 17/237,329

(22) Filed: Apr. 22, 2021

(65) Prior Publication Data

US 2021/0336846 A1    Oct. 28, 2021

(30) Foreign Application Priority Data

Apr. 24, 2020    (EP) ..................................... 20171321

(51) Int. Cl.
*H04L 41/0806* (2022.01)
*H04J 3/06* (2006.01)
*H04L 9/08* (2006.01)
*H04L 9/32* (2006.01)

(52) U.S. Cl.
CPC ........ *H04L 41/0806* (2013.01); *H04J 3/0667* (2013.01); *H04L 9/088* (2013.01); *H04L 9/0825* (2013.01); *H04L 9/3213* (2013.01); *H04L 9/3247* (2013.01)

(58) Field of Classification Search
CPC ... H04L 41/0806; H04L 9/0825; H04L 9/088; H04L 9/3213; H04L 9/3247; H04J 3/0667
See application file for complete search history.

(56) References Cited

U.S. PATENT DOCUMENTS

| 10,997,538 | B1* | 5/2021 | Chandrachood ............................ G06Q 10/06312 |
| 2008/0009345 | A1* | 1/2008 | Bailey ................. G07F 17/3251 463/29 |
| 2008/0183623 | A1 | 7/2008 | Xu et al. |

(Continued)

FOREIGN PATENT DOCUMENTS

WO    2007003362 A1    1/2007

OTHER PUBLICATIONS

Search Report from corresponding EP Application No. 20171321.1, dated Sep. 24, 2020.

*Primary Examiner* — Azizul Choudhury
(74) *Attorney, Agent, or Firm* — Workman Nydegger (57) ABSTRACT

A provisioning control apparatus couples to a provisioning equipment server electrically connectable with an electronic device(s) for provisioning the electronic device(s) with a program code. The provisioning control apparatus has a communication interface which transmits the program code to the provisioning equipment server for provisioning the electronic device(s) with the program code and to receive an electronic provisioning token having provisioning control data. The provisioning control apparatus includes a processor that controls the transmission of the program code via the communication interface to the provisioning equipment server. The electronic provisioning token has time adjustment information for adjusting the clock, and the processor adjusts the time of the clock. A provisioning control system includes the provisioning control apparatus and a method involves provisioning the electronic device(s).

16 Claims, 4 Drawing Sheets

(56) References Cited

U.S. PATENT DOCUMENTS

| | | | |
|---|---|---|---|
| 2008/0195869 A1 | 8/2008 | Kim et al. | |
| 2014/0380330 A1* | 12/2014 | Xiao | G06F 9/5016 |
| | | | 718/104 |
| 2019/0080406 A1* | 3/2019 | Molinari | G06Q 20/065 |
| 2020/0153627 A1* | 5/2020 | Wentz | H04L 9/3239 |
| 2020/0336494 A1* | 10/2020 | Kitagata | H04L 63/0807 |
| 2021/0118069 A1* | 4/2021 | Deshmukh | G06Q 20/385 |

* cited by examiner

PROVISIONING CONTROL APPARATUS, SYSTEM AND METHOD

TECHNICAL FIELD

The invention relates to the secure production and provisioning of electronic devices. More specifically, the invention relates to an apparatus, system and method for controlling the provisioning of electronic devices.

BACKGROUND OF THE INVENTION

The production and assembly of state-of-the-art electronic consumer equipment, such as smartphones, tablet computers as well as other types of IoT devices, often happens in a distributed fashion in that the various electronic components or devices, including the electronic chips or microprocessors of the electronic consumer equipment are manufactured, provisioned or personalized and finally assembled at different locations and by different parties. For instance, an electronic chip or microprocessor for an electronic consumer equipment may be originally manufactured by a chip manufacturer and provisioned by another party with a suitable firmware, before being assembled into the final end product by the manufacturer of the electronic consumer equipment, e.g. an OEM.

For such distributed processing chains of electronic equipment there is a need for apparatuses, systems and methods allowing for a secure and controlled provisioning of electronic components or devices, such as chips or microprocessors of the electronic equipment.

SUMMARY OF THE INVENTION

It is therefore an object of the invention to provide apparatuses, systems and methods allowing for a secure and controlled provisioning of electronic devices, such as chips or microprocessors for electronic equipment.

The foregoing and other objects are achieved by the subject matter of the independent claims. Further implementation forms are apparent from the dependent claims, the description and the figures.

According to a first aspect a provisioning control apparatus configured to be coupled to a provisioning equipment server is provided, wherein the provisioning equipment server is electrically connectable with one or more electronic devices for provisioning the one or more electronic devices with a program code. The electronic devices may comprise chips, microprocessors or other programmable electronic components, such as Flash memories, electrically erasable programmable read only memories (EEPROM), programmable logic devices (PLDs), field programmable gate arrays (FPGAs), and microcontrollers incorporating non-volatile memory elements. The program code may be a firmware. The program code may be digitally signed. The program code may be a personalized program code, i.e. a personalized version of a generic program code in that the personalized program code can only be used to provision, i.e. personalize one electronic device.

The provisioning control apparatus comprises a communication interface configured to transmit the program code to the provisioning equipment server for provisioning the one or more electronic devices with the program code and to receive an electronic provisioning token comprising provisioning control data for controlling the provisioning of the one or more electronic devices with the program code. Moreover, the provisioning control apparatus comprises a processor configured to control the transmission of the program code via the communication interface to the provisioning equipment server on the basis of the provisioning control data and a clock configured to provide a time. The electronic provisioning token further comprises time adjustment information for adjusting the time of the clock. The processor is further configured to adjust the time of the clock on the basis of the time adjustment information of the electronic provisioning token for obtaining an adjusted time of the clock and to verify a provisioning control authorization of the electronic provisioning token, i.e. whether the electronic provisioning token is authorized to control the provisioning of the one or more electronic devices, using the adjusted time of the clock. In an embodiment, the processor may be configured to verify the provisioning control authorization of the electronic provisioning token using the adjusted time of the clock by verifying an expiry date/time of the electronic provisioning token relative to the adjusted time of the clock, by verifying one or more validity periods of the electronic provisioning token relative to the adjusted time of the clock and/or by verifying one or more certificates of the electronic provisioning token using the adjusted time of the clock.

In a further embodiment, the processor of the provisioning control apparatus is further configured to verify a time adjustment authorization of the electronic provisioning token, i.e. afforded by the electronic provisioning token and to adjust the time of the clock on the basis of the time adjustment information of the electronic provisioning token for obtaining the adjusted time, in case the time adjustment authorization of the electronic provisioning token has been successfully verified. Otherwise, i.e. in case the time adjustment authorization has not been successfully verified, the processor will not perform the adjustment of the time of the clock on the basis of the time adjustment information of the electronic provisioning token.

In a further embodiment, the electronic provisioning token further comprises a digital signature, wherein the processor is configured to verify the time adjustment authorization of the electronic provisioning token by verifying the digital signature of the electronic provisioning token. This allows the provisioning control apparatus to securely determine whether the electronic provisioning token is authorized to adjust the time of the clock.

In a further embodiment, the time adjustment information of the electronic provisioning token comprises a positive or negative time differential, wherein the processor of the provisioning control apparatus is configured to adjust the time of the clock for obtaining the adjusted time by adding the positive or negative time differential to the time of the clock.

In a further embodiment, the time adjustment information of the electronic provisioning token comprises an electronic link or address information of a remote clock server providing a standard time, wherein the processor is configured to obtain on the basis of the electronic link or address information the standard time from the remote clock server for adjusting the time of the clock so that the adjusted time of the clock corresponds, i.e. is equal to the standard time of the remote clock server.

In a further embodiment, the electronic provisioning token further comprises a digital signature of the electronic link or address information of the remote clock server, wherein the processor is configured to verify the digital signature of the electronic link or address information of the remote clock server using a public key of the remote clock server or a public key of a token generator server.

In a further embodiment, the communication interface is further configured to receive a time adjustment request from the provisioning equipment server, wherein the time adjustment request comprises a time adjustment differential and wherein the processor is configured to adjust the time of the clock on the basis of the time adjustment differential for obtaining the adjusted time, if the absolute value of the time adjustment differential is smaller than a time differential threshold.

In a further embodiment, the communication interface is further configured to receive a time synchronization message from the provisioning equipment server, wherein the time synchronization message comprises a time of the provisioning equipment server and wherein the processor is configured to adjust the local time of the clock so that the adjusted time of the clock corresponds. i.e. is equal to the time of the provisioning equipment server, in case the absolute value of the difference, i.e. drift between the time of the clock and the time of the provisioning equipment server is smaller than a time differential threshold.

In a further embodiment, the time differential threshold is constant or the time differential threshold is proportional to an elapsed time interval since a most recent adjustment of the time of the clock.

In a further embodiment, the electronic provisioning token further comprises data defining one or more validity time periods of the electronic provisioning token, wherein the processor is configured to control the transmission of the program code via the communication interface to the provisioning equipment server by prohibiting a transmission of the program code towards the provisioning equipment server, if the current local time provided by the clock is outside of the one or more validity time periods. Advantageously, this allows restricting the provisioning of the electronic devices to specific times.

In a further embodiment, the electronic provisioning token further comprises a provisioning counter, wherein the provisioning counter indicates a total number of transmissions of the program code towards the provisioning equipment server. The processor is further configured to update a value of the provisioning counter for each transmission of the program code towards the provisioning equipment server to obtain an updated provisioning counter and to prohibit a further transmission of the program code towards the provisioning equipment server if the updated provisioning counter indicates that the total number of transmissions has been reached. Advantageously, by means of the provisioning counter the provisioning control apparatus has control over the provisioning of the electronic devices by the provisioning equipment server. The provisioning control apparatus and the provisioning equipment server may be under the control of different parties.

In a further embodiment, the communication interface is configured to receive the electronic provisioning token over a communication network, such as the Internet, from a remote server. The remote server may be the server of or associated with an electronic equipment manufacturer (herein also referred to as OEM) that uses the electronic devices provisioned with its firmware for assembling electronic equipment, such as smartphones, tablet computers as well as other types of IoT devices. Advantageously, this allows the electronic equipment manufacturer to have control over the provisioning of the electronic devices by the provisioning equipment server with its firmware.

In a further embodiment, the communication interface may be configured to communicate with the provisioning equipment server via a wired connection. In an embodiment, the provisioning equipment server may be implemented as a personal computer and the provisioning control apparatus may be implemented as a PC card inserted in the provisioning equipment server.

In a further embodiment, the electronic provisioning token may comprise provisioning control data for controlling communications with the provisioning equipment server, wherein the processor is configured to retrieve the provisioning control data from the electronic provisioning token and to control communications of the communication interface with the provisioning equipment server according to the provisioning control data. In an embodiment, these provisioning control data may be provided in a header of the electronic provisioning token. Advantageously, this allows controlling the communication between the provisioning control apparatus and the provisioning equipment server, for instance, by selecting a secure communication protocol.

In a further embodiment, the electronic provisioning token may further comprise a token identifier for identifying the electronic provisioning token, wherein the provisioning control apparatus further comprises an electronic memory, wherein the electronic memory is configured to store the token identifier in a list of electronic provisioning tokens already used or in use. Advantageously, this allows protecting the provisioning control apparatus against a replay attack, i.e. an attack, where an already used electronic provisioning token is provided again for provisioning electronic devices. In an embodiment, the token identifier may be a nonce generated when generating the electronic provisioning token.

In a further embodiment, the electronic provisioning token may further comprise an electronic device type identifier, wherein the processor is configured to prohibit a transmission of the program code towards the provisioning equipment server for provisioning an electronic device not corresponding to the electronic device type identified by the electronic device type identifier. Advantageously, this allows making sure that only the intended electronic devices are provisioned with the program code using the electronic provisioning token. The electronic device type identifier may be, for instance, an identifier of a specific chip or microprocessor type.

In a further embodiment, the electronic provisioning token may further comprise a program code identifier, wherein the processor is configured to prohibit a transmission of the program code towards the provisioning equipment server, if the program code differs from the program code identified by the program code identifier. Advantageously, this allows making sure that only the intended program code, e.g. firmware is used for provisioning the electronic devices.

In a further embodiment, the communication interface is configured to receive the electronic provisioning token in encrypted form, wherein the processor is configured to decrypt the encrypted electronic provisioning token. A hybrid encryption scheme, such as PKCS#7, may be used. Advantageously, this allows preventing a malicious party from using an intercepted electronic provisioning token.

According to a second aspect the invention relates to a provisioning control system comprising: a provisioning control apparatus according to the first aspect of the invention; a provisioning equipment server being electrically connectable with one or more electronic devices for provisioning the one or more electronic devices with a program code, wherein the provisioning control apparatus is coupled to the provisioning equipment server for controlling the provisioning of the one or more electronic devices; and a token generator server configured to generate the electronic provisioning token.

In a further embodiment of the system according to the second aspect, the token generator server may be configured to generate the electronic provisioning token in response to a token request from a remote server, e.g. the remote server of the electronic equipment manufacturer. Advantageously, this allows the token generator server to generate and provide the electronic provisioning token on demand. In response to the request the token generator server may provide the generated electronic provisioning token to the remote server, which, in turn, may forward the generated electronic provisioning token to the provisioning control apparatus. Alternatively, the token generator server may provide the generated electronic provisioning token directly to the provisioning control apparatus.

In a further embodiment of the system according to the second aspect, the token generator server is configured to verify a digital signature of the token request using a public key of the remote server, before providing the electronic provisioning token to the remote server. Advantageously, this allows the token generator server to verify the remote server to be trustworthy.

In a further embodiment of the system according to the second aspect, the token generator server is configured to digitally sign the electronic provisioning token using a private key. Advantageously, this allows the provisioning control apparatus to verify that the electronic provisioning token has been generated by a trustworthy source.

According to a third aspect the invention relates to a corresponding method for controlling by the provisioning control apparatus the provisioning of one or more electronic devices with a program code by the provisioning equipment server. The method comprises the steps of:

receiving by the provisioning control apparatus an electronic provisioning token, wherein the electronic provisioning token comprises provisioning control data for controlling the provisioning of the one or more electronic devices with the program code and time adjustment information for adjusting a time of a clock of the provisioning control apparatus;

adjusting the time of the clock of the provisioning control apparatus on the basis of the time adjustment information of the electronic provisioning token for obtaining an adjusted time of the clock; and verifying a provisioning control authorization of the electronic provisioning token using the adjusted time of the clock.

Embodiments of the invention can be implemented in hardware and/or software.

BRIEF DESCRIPTION OF THE DRAWINGS

Further embodiments of the invention will be described with respect to the following figures, wherein.

In the figures, identical reference signs will be used for identical or at least functionally equivalent features.

DETAILED DESCRIPTION OF EMBODIMENTS

In the following detailed description, reference is made to the accompanying drawings, which form part of the disclosure, and in which are shown, by way of illustration, specific aspects in which the present invention may be implemented. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
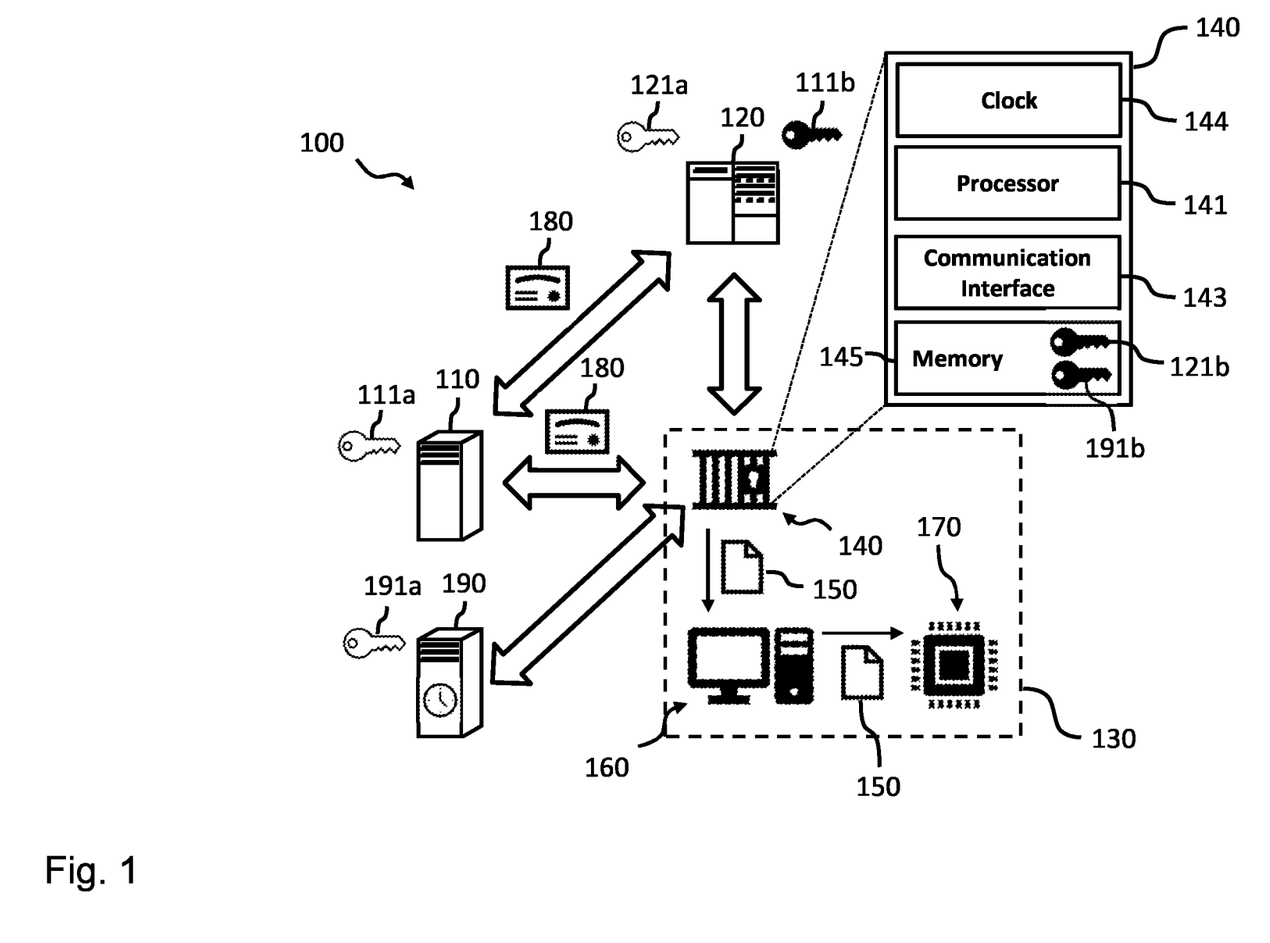
FIG. 1 shows a schematic diagram illustrating a provisioning control system according to an embodiment of the invention, including a provisioning control apparatus according to an embodiment of the invention.

FIG. 1 shows a schematic diagram of a provisioning control system 100 according to an embodiment of the invention, including a provisioning control apparatus 140 according to an embodiment of the invention. As will be described in more detail further below, the provisioning control system 100 may comprise in addition to the provisioning control apparatus 140 a remote server 110, a token generator server 120, a remote clock server 190 and a provisioning equipment server 160 for provisioning or personalizing electronic devices 170, such as chips or microprocessors 170 with a program code 150, e.g. firmware 150.

As illustrated in FIG. 1, the provisioning control apparatus 140, the remote server 110, the token generator server 120 and the remote clock server 190 may be configured to communicate with each other via a communication network, such as the Internet. Thus, the provisioning control apparatus 140, the remote server 110, the token generator server 120 and the remote clock server 190 may be at different locations and under the control of different parties. As illustrated in FIG. 1, the provisioning control apparatus 140 and the provisioning equipment server 160 may be located within a production or provisioning environment 130, such as a personalization factory 130.

In an embodiment, the remote server 110 may be under the control or associated with an electronic equipment manufacturer, e.g. an OEM, wherein the electronic equipment manufacturer assembles electronic equipment, such as smartphones, tablet computers or other types of IoT or electronic consumer equipment, using the electronic devices 170 provisioned by the provisioning equipment server 160 with the program code 150. In an embodiment, the program code 150 may be a firmware of the electronic equipment manufacturer associated with the remote server 110. Advantageously, this allows the electronic equipment manufacturer to have control over the provisioning of the electronic devices with its firmware by means of the provisioning control apparatus.

In an embodiment, the provisioning control apparatus 140, the remote server 110, the token generator server 120 and/or the remote clock server 190 are configured to securely communicate with each other using one or more cryptographic schemes, such as a public key infrastructure and/or a hybrid cryptographic scheme.

The provisioning control apparatus 140 is configured to be coupled to the provisioning equipment server 160, for instance, by a wired or a wireless connection. In an embodiment, the provisioning equipment server 160 may be implemented as a personal computer and the provisioning control apparatus 140 may be implemented as a PC card inserted in the provisioning equipment server 160. The provisioning equipment server 160 may comprise an electrical and/or mechanical interface for interacting directly or indirectly via a provisioning equipment with the electronic devices 170. For instance, the provisioning equipment server 160 may comprise a personalization tray for personalizing a batch of electronic devices 170 inserted therein.

Figure 2:
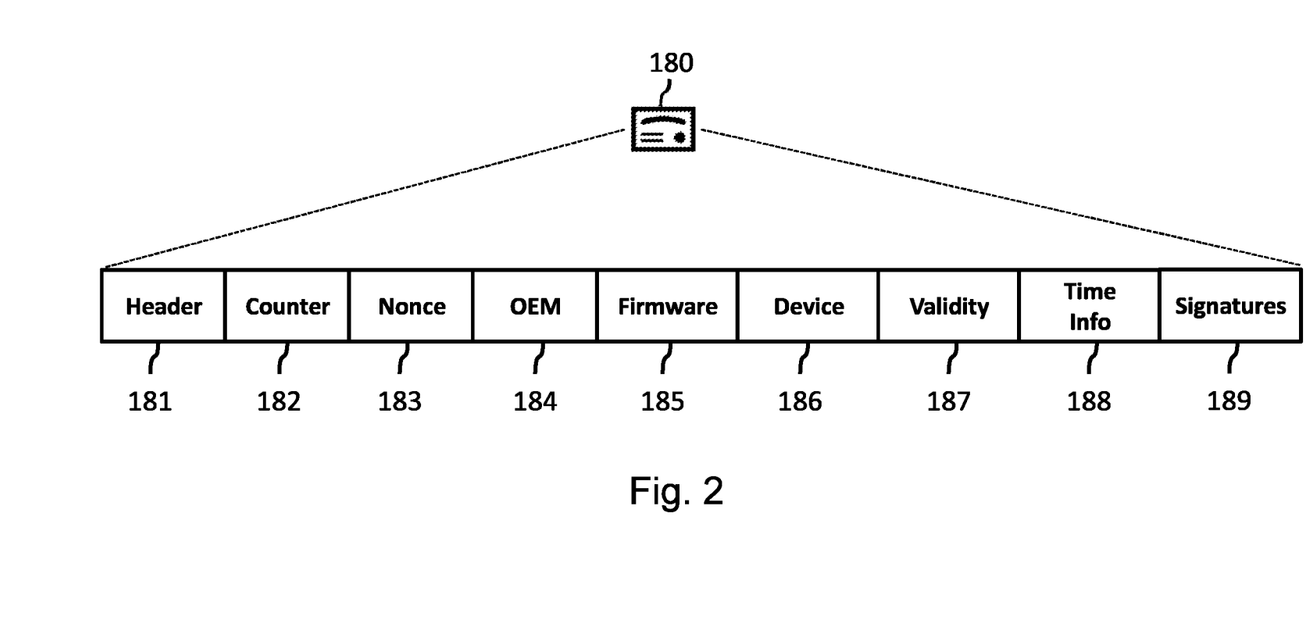
FIG. 2 shows a schematic diagram illustrating an exemplary electronic provisioning token used by the provisioning control apparatus of FIG. 1.

In the embodiment illustrated in FIG. 1 the provisioning control apparatus 140 comprises a processor 141, a communication interface 143, a clock 144, such as a crystal oscillator for providing a time and a non-transient memory 145. The communication interface 143 is configured to transmit the program code 150 to the provisioning equipment server 160 for provisioning the one or more electronic devices 170 with the program code 150. Moreover, the communication interface 143 is configured to receive an electronic provisioning token 180 comprising provisioning control data for controlling the provisioning of the one or more electronic devices 170 with the program code 150. An exemplary electronic provisioning token 180 comprising provisioning control data for controlling the provisioning of the one or more electronic devices 170 with the program code 150 by the provisioning control apparatus 140 is illustrated in FIG. 2. As will be described in more detail below, the processor 141 is configured to control the transmission of the program code 150 via the communication interface 143 to the provisioning equipment server 160, for instance, on the basis of the provisioning control data provided by the electronic provisioning token 180.

As illustrated in FIG. 2, in addition to the provisioning control data the electronic provisioning token 180 comprises time adjustment information 188 for adjusting the time of the clock 144. As will be described in more detail below, the processor 141 is further configured to adjust the time of the clock 144 on the basis of the time adjustment information 188 provided by the electronic provisioning token for obtaining an adjusted time of the clock 144 and to verify a provisioning control authorization of the electronic provisioning token 180 using the adjusted time of the clock 144. For instance, the processor 141 may be configured to verify the provisioning control authorization of the electronic provisioning token 180 using the adjusted time of the clock 144 by verifying an expiry date/time of the electronic provisioning token 180 relative to the adjusted time of the clock 144, by verifying one or more validity periods of the electronic provisioning token 180 relative to the adjusted time of the clock 144 and/or by verifying one or more certificates of the electronic provisioning token 180 using the adjusted time of the clock 144.

In an embodiment, the electronic provision token 180 is generated by the token generator server 120. In an embodiment, the token generator server 120 may be configured to generate the electronic provisioning token 180 in response to a token request from the remote server 110 associated with the electronic equipment manufacturer. Advantageously, this allows the token generator server 120 to generate and provide the electronic provisioning token 180 on demand, i.e. when the electronic equipment manufacturer wants to obtain electronic devices 170 provisioned by the provisioning equipment server 160 with the program code 150 for assembling electronic equipment.

In response to the request the token generator server 120 may provide the generated electronic provisioning token 180 to the remote server 110, which, in turn, may forward the generated electronic provisioning token 180 to the provisioning control apparatus 140. In a further embodiment, the token generator server 120 may provide the generated electronic provisioning token 180 directly to the provisioning control apparatus 140.

In an embodiment, the communication interface 143 of the provisioning control apparatus 140 is configured to receive the electronic provisioning token 180 in encrypted form, wherein the processor 141 is configured to decrypt the encrypted electronic provisioning token 180. For instance, a hybrid encryption scheme, such as PKCS#7, may be used. Advantageously, this allows preventing a malicious party from successfully using an intercepted electronic provisioning token 180.

In an embodiment, the electronic provisioning token 180 comprises one or more digital signatures 189 (as illustrated in FIG. 2) based, for instance, on a private key 121$a$ of the token generator server 120, wherein the processor 141 of the provisioning control apparatus 140 is configured to verify the digital signature 189 of the electronic provisioning token 180 using a public key 121$b$ of the token generator server 120. Advantageously, this allows the provisioning control apparatus 140 to verify that the electronic provisioning token 180 initially has been generated by a trustworthy source, namely the token generator server 120. As illustrated in FIG. 1, the public key 121$b$ of the token generator server 120 may be stored in the memory 145 of the provisioning control apparatus 140.

In an embodiment, the processor 141 of the provisioning control apparatus 140 is further configured to verify a time adjustment authorization of the electronic provisioning token 180, i.e. afforded by the electronic provisioning token 180 and to adjust the time of the clock 144 on the basis of the time adjustment information 188 of the electronic provisioning token 180 for obtaining the adjusted time of the clock, in case the time adjustment authorization of the electronic provisioning token 180 has been successfully verified. Otherwise, i.e. in case the time adjustment authorization has not been successfully verified, the processor 141 will not perform the adjustment of the time of the clock 144 on the basis of the time adjustment information 188 of the electronic provisioning token 180. In an embodiment, the processor 141 is configured to verify the time adjustment authorization of the electronic provisioning token 180 by verifying a digital signature 189 of the electronic provisioning token 180.

In an embodiment, the time adjustment information 188 of the electronic provisioning token 180 comprises a positive or negative time differential (such as −20 milliseconds or +10 milliseconds), wherein the processor 141 is configured to adjust the time of the clock 144 for obtaining the adjusted time of the clock 144 by adding the positive or negative time differential to the current time of the clock 144.

In a further embodiment, the time adjustment information 188 of the electronic provisioning token 180 comprises an electronic link or address information, such as a URL 188 of the remote clock server 190 providing a standard time. In an embodiment, the processor 141 is configured to obtain on the basis of the electronic link or address information 188 the standard time from the remote clock server 190 for adjusting the time of the clock 144 so that the adjusted time of the clock 144 corresponds, i.e. is equal to the standard time obtained from the remote clock server 190. For instance, based on the URL 188 the provisioning control apparatus 140 may request the current standard time from the remote clock server 190. In an embodiment, the standard time provided by the remote clock server 190 may be based on a DCF77 transmitter. In an embodiment, the remote clock server 190 may be a Network Time Protocol (NTP) time server 190. Although the remote clock server 190 is illustrated as a component separate from the token generator server 120 in FIG. 1, in further embodiments the remote clock server 190 may be implemented as a component of the token generator server 120. In other words, the standard time for adjusting the current time of the clock 144 of the provisioning control apparatus 140 may be provided by the token generator server 120 itself.

In an embodiment, the electronic provisioning token 180 may comprise a further digital signature 189 of the electronic link or address information 188 of the remote clock server 190, wherein the processor 141 of the provisioning control apparatus 140 is configured to verify the further digital signature 189 of the electronic link or address information 188 of the remote clock server 190 using a public key 191b of the remote clock server 190 or a public key 121b of the token generator server 120 (stored in the memory 145 of the provisioning control apparatus 140). The provisioning control apparatus 140 may be configured to use this further digital signature 189 to authorize a request to the remote clock server 190 or the token generator server 120 for obtaining the standard time.

In an embodiment, the communication interface 143 is further configured to receive a time adjustment request from the provisioning equipment server 160 (for instance in response to the detection of a substantial drift between the time of the clock 144 of the provisioning control apparatus 140 and a time of the provisioning equipment server 160). In an embodiment, the time adjustment request may comprise a time adjustment differential, wherein the processor 141 of the provisioning control apparatus 140 is configured to adjust the current time of the clock 144 on the basis of the time adjustment differential for obtaining the adjusted time, if the absolute value of the time adjustment differential is smaller than a time differential threshold. Otherwise, i.e. if the absolute value of the time adjustment differential is larger than the time differential threshold, the processor 141 of the provisioning control apparatus 140 will not adjust the current time of the clock 144 on the basis of the time adjustment differential.

In a further embodiment, the communication interface 143 of the provisioning control apparatus 140 is further configured to receive a time synchronization message, e.g. a periodic synchronization signal from the provisioning equipment server 160, wherein the time synchronization message comprises a current time of the provisioning equipment server 160. In an embodiment, the processor 141 of the provisioning control apparatus 140 is configured to adjust the time of the clock 144 so that the adjusted time of the clock 144 corresponds, i.e. is equal to the time of the provisioning equipment server 160, in case the absolute value of the difference between the current time of the clock 144 and the current time of the provisioning equipment server 160 is smaller than the time differential threshold. Otherwise, i.e. if the absolute value of the difference between the current time of the clock 144 and the current time of the provisioning equipment server 160 is not smaller than the time differential threshold, the processor 141 of the provisioning control apparatus 140 will not adjust the current time of the clock 144 to the current time of the provisioning equipment server 160.

In an embodiment, the time differential threshold may be a fixed constant (such as 20 msec) or the time differential threshold may proportional to an elapsed time interval since the most recent adjustment of the time of the clock 144, i.e. the time differential threshold may increase in time.

In an embodiment, the electronic provisioning token 180 may further comprise data 187 defining one or more validity time periods of the electronic provisioning token 180. The processor 141 of the provisioning control apparatus 140 may be configured to control the transmission of the program code 150 via the communication interface 143 to the provisioning equipment server 160 using the adjusted time of the clock 144 by prohibiting a transmission of the program code 150 towards the provisioning equipment server 160, if the adjusted time of the clock 144 is outside of the one or more validity time periods.

As illustrated in FIG. 2, the provisioning control data of the electronic provisioning token 180 may further comprise a provisioning counter 182 indicating a total number of allowed transmissions of the program code 150 towards the provisioning equipment server 160. Once received by the communication interface 143, the processor 141 of the provisioning control apparatus 140 may be configured to retrieve the provisioning counter 182 from the received electronic provisioning token 180, i.e. the total number of allowed transmissions of the program code 150 via the communication interface 143 to the provisioning equipment server 160. For each transmission of the program code 150 via the communication interface 143 to the provisioning equipment server 160 the processor 141 of the provisioning control apparatus 140 may be configured to update the value of the provisioning counter 182 and to obtain an updated value of the provisioning counter 182. For instance, the processor 141 may be configured to decrement the current value of the provisioning counter 182 by one for each transmission of the program code 150 via the communication interface 143 to the provisioning equipment server 160.

In an embodiment, the processor 141 of the provisioning control apparatus 140 may be further configured to prohibit a further transmission of the program code 150 to the provisioning equipment server 160, if the updated value of the provisioning counter 182 indicates that the total number of transmissions has been reached. In other words, once the total number of electronic devices 170 (as indicated by the initial provision counter 182) have been provisioned with the program code 150 by the provisioning equipment server 160, the provisioning control apparatus 140 may block the provisioning of further electronic devices 170 with the program code 150 by the provision equipment server 160. In an embodiment, each program code 150 may be digitally signed and/or personalized for only one respective electronic device 170, such as by means of a unique firmware identifier. In an embodiment, the program code 150 is initially provided to the provisioning control apparatus 140 by the remote server 110 associated with the electronic equipment manufacturer.

As illustrated in FIG. 2, in addition to the provisioning counter 182 the electronic provisioning token 180 may comprise further provisioning control data 181 for controlling communications with the provisioning equipment server 160. The processor 141 may be configured to retrieve the further provisioning control data 181 from the electronic provisioning token 180 and to control communications of the communication interface 143 with the provisioning equipment server 160 according to the further provisioning control data 181. As illustrated in FIG. 2, these further provisioning control data 181 may be provided in a header 181 of the electronic provisioning token 180. Advantageously, this allows controlling the communication between the provisioning control apparatus 140 and the provisioning equipment server 160, for instance, by selecting a secure communication protocol on the basis of the further provisioning control data 181.

Furthermore, the electronic provisioning token 180 may comprise a token identifier 183 for uniquely identifying the electronic provisioning token 180, wherein the electronic memory 145 of the provisioning control apparatus 140 is configured to store the token identifier 183 in a list (i.e. black list) of electronic provisioning tokens 180 already used or in use. Advantageously, this allows protecting the provisioning control apparatus 140 against a replay attack, i.e. an attack, where an already used electronic provisioning token is provided again for provisioning electronic devices. In an embodiment, the token identifier 183 may be a nonce 183 generated by the token generator server 120 when generating the electronic provisioning token 180.

As illustrated in FIG. 2, the electronic provisioning token 180 may further comprise an electronic device type identifier 186. The processor 141 may be configured to prohibit a transmission of the program code 150 towards the provisioning equipment server 160 for provisioning an electronic device 170 not corresponding to the electronic device type identified by the electronic device type identifier 186. Advantageously, this allows making sure that only the intended electronic devices 170 are provisioned with the program code 150 using the electronic provisioning token 180. The electronic device type identifier 186 may be, for instance, an identifier of a specific chip or microprocessor type.

Moreover, the electronic provisioning token 180 may further comprise a program code identifier 185, e.g. firmware identifier 185. The processor 141 may be configured to prohibit a transmission of the program code 150 towards the provisioning equipment server 160, if the program code 150 differs from the program code identified by the program code identifier 185. Advantageously, this allows making sure that only the intended program code, e.g. firmware 150 is used for provisioning the electronic devices 170. As illustrated in FIG. 2, the electronic provisioning token may further comprise an identifier 184 for identifying the electronic equipment manufacturer, e.g. OEM.

Figure 3:
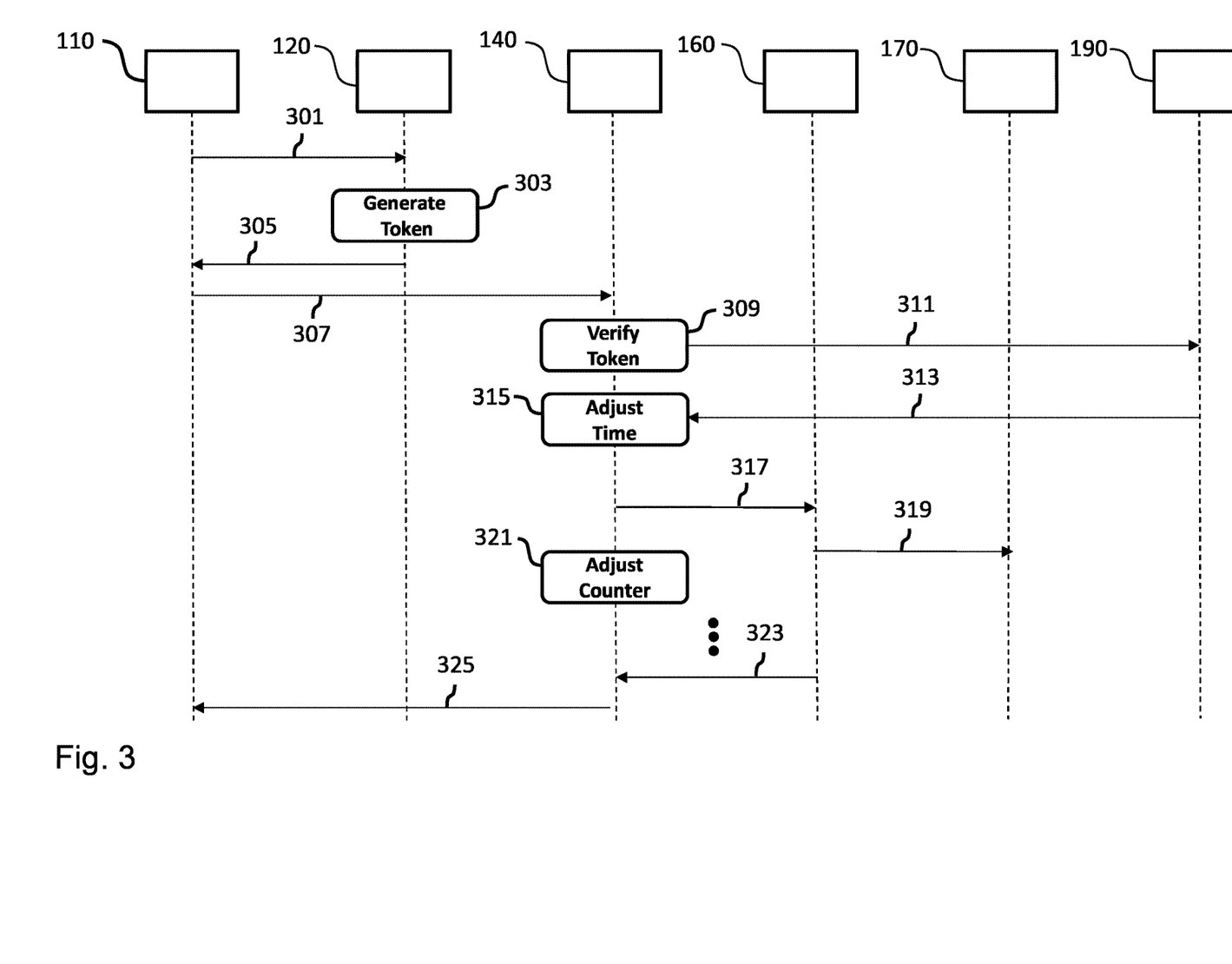
FIG. 3 shows a signaling diagram illustrating the interaction of the provisioning control apparatus of FIG. 1 with the other components of the provisioning control system of FIG. 1.

FIG. 3 shows a signaling diagram illustrating the interaction of the provisioning control apparatus 140 with the other components of the provisioning control system 100, i.e. the remote server 110, the token generator server 120, the remote clock server 190, the provisioning equipment server 160 and the electronic device(s) 170 to be provisioned. In FIG. 3 the following steps are illustrated, some of which already have been described in the context of FIGS. 1 and 2 above.

In step 301 of FIG. 3, the remote server 110 (associated, for instance, with a specific electronic equipment manufacturer) sends a token request to the token generator server 120. The token request may be digitally signed by the remote server 110 using a private key 111*a*. Thus, the token generator server 120 may be configured to verify the digital signature of the token request using a public key 111*b* of the remote server 110, before providing the electronic provisioning token to the remote server 110. Advantageously, this allows the token generator server 120 to verify the remote server 110 to be trustworthy.

In response to the request of step 301 the token generator server 120 in step 303 of FIG. 3 generates an electronic provisioning token 180. In addition to the time adjustment information and the provisioning counter 182 the electronic provisioning token 180 may comprise one or more of the further data elements illustrated in FIG. 2. In an embodiment, the token generator server 120 is configured to digitally sign the electronic provisioning token 180 or components thereof using, for instance, the private key 121*a*.

In step 305 the token generator server 120 provides the electronic provisioning token 180 to the remote server 110, which, in turn, forwards the electronic provisioning token 180 to the provisioning control apparatus 140 (step 307 of FIG. 3). In a further embodiment, the token generator server 120 may provide the electronic provisioning token 180 directly to the provisioning control apparatus 140.

Once received the provisioning control apparatus 140 verifies the time adjustment authorization of the electronic provisioning token 180 in step 309 of FIG. 3, i.e. whether the electronic provisioning token 180 authorizes an adjustment of the current time of the clock 144 of the provisioning control apparatus 140 on the basis of the time adjustment information 188. In an embodiment, the processor 141 of the provisioning control apparatus 140 is configured to verify the time adjustment authorization of the electronic provisioning token 180 by verifying one of the digital signatures 189 of the electronic provisioning token 180 using, for instance, the public key 121*b* of the token generator server 120 or the public key 191*b* of the remote clock server 190.

Once the processor 141 of the provisioning control apparatus 140 has successfully verified the time adjustment authorization of the electronic provisioning token 180 in step 309 of FIG. 3, it will adjust the current time of the clock 144 on the basis of the time adjustment information 188 provided in the electronic provisioning token 180. In the embodiment shown in FIG. 3, the time adjustment information 188 comprises a URL of the remote clock server 190, which the provisioning control apparatus 140 uses in step 311 of FIG. 3 for identifying and accessing the remote clock server 190.

In doing so, the provisioning control apparatus 140 obtains in step 313 of FIG. 3 the standard time of the remote clock server 190 and adjusts the current time of its clock 144 on the basis thereof so that the adjusted time of the clock 144 corresponds, i.e. is equal to the standard time of the remote clock server 190 (step 315 of FIG. 3). As already described above, in an embodiment, the remote clock server 190 may be implemented as a component of the token generator server 120.

Once local time of the clock 144 has been adjusted in step 315 of FIG. 3, the provisioning control apparatus 140 verifies the provisioning control authorization of the electronic provisioning token 180 using the adjusted time of the clock 144 and, if successful, provides a first personalized program code 150 to the provisioning equipment server 160 (step 317 of FIG. 3), which, in turn, uses the personalized program code 150 for provisioning the first electronic device 170 (step 319 of FIG. 3). For each transmission of a personalized program code 150 the provisioning control apparatus 140 adjusts the value of the provisioning counter 182 (step 321 of FIG. 3). This provisioning of the electronic devices 170 continues until the total number of allowed electronic devices 170 has been provisioned by the provisioning equipment server 160. In step 323 of FIG. 3, the provisioning equipment server 160 sends a corresponding report to the provisioning control apparatus 140. At this stage, the provisioning control apparatus 140 will block any further transmissions of personalized program code 150 to the provisioning equipment server 160 and, thus, block the personalized provisioning of any further electronic devices 170.

In step 325 of FIG. 3 the provisioning control apparatus 140 reports to the remote server 110 associated with the electronic equipment manufacturer that the total number of electronic devices 170 (as indicated by the initial provisioning counter 182 of the electronic provisioning token 180) have been provisioned with a respective personalized program code 150. This may trigger the remote server 110 to provide a further electronic provisioning token to the provisioning control apparatus 140 and/or to request a new electronic provisioning token from the token generator server 120.

Figure 4:
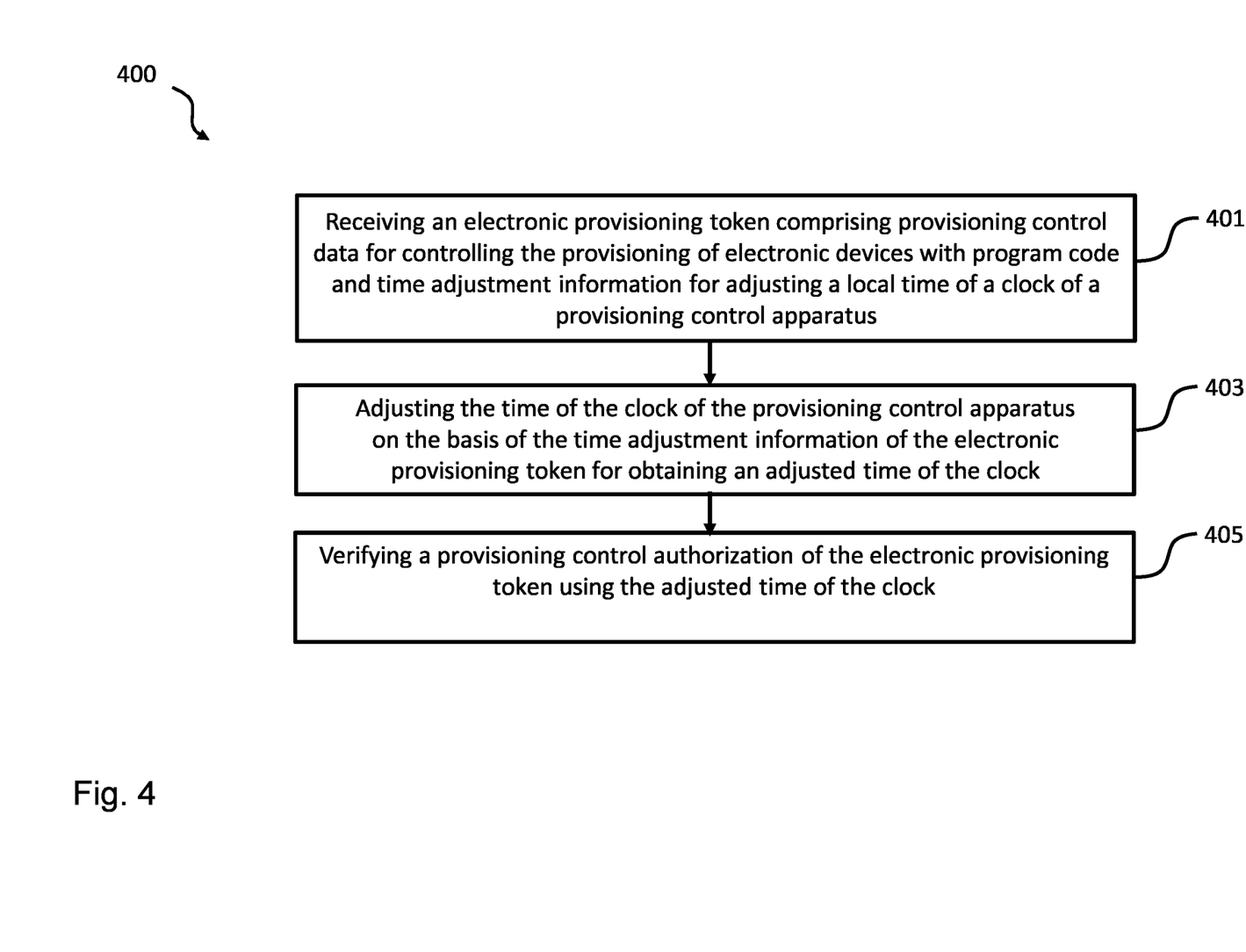
FIG. 4 shows a flow diagram illustrating steps of a provisioning control method according to an embodiment of the invention.

FIG. 4 shows a flow diagram illustrating steps of a correspond method 400 for controlling by the provisioning control apparatus 140 the provisioning of one or more electronic devices 170 with a program code 150 by the provisioning equipment server 160. The method 400 comprises the steps of:
receiving 401 by the provisioning control apparatus 140 an electronic provisioning token 180, wherein the electronic provisioning token 180 comprises provisioning control data for controlling the provisioning of the one or more electronic devices 170 with the program code 150 and time adjustment information 188 for adjusting a time of the clock 144 of the provisioning control apparatus 140;
adjusting 403 the time of the clock 144 of the provisioning control apparatus 140 on the basis of the time adjustment information 188 of the electronic provisioning token 180 for obtaining an adjusted time of the clock 144; and
verifying 405 a provisioning control authorization of the electronic provisioning token 180 using the adjusted time of the clock 144.

As will be appreciated, embodiments of the invention provide a higher flexibility with respect to the secure production and personalization of electronic devices and equipment. Moreover, embodiments of the invention allow delegating secure production of electronic devices and components for electronic equipment. Moreover, embodiments of the invention allow load balancing and on-demand production/personalization of security critical systems.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application.

Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A provisioning control apparatus configured to be coupled to a provisioning equipment server, the provisioning equipment server being electrically connectable with one or more electronic devices for provisioning the one or more electronic devices with a program code, wherein the provisioning control apparatus comprises:
a communication interface configured to transmit the program code to the provisioning equipment server for provisioning the one or more electronic devices with the program code and to receive an electronic provisioning token comprising provisioning control data for controlling the provisioning of the one or more electronic devices with the program code;
a processor configured to control the transmission of the program code via the communication interface to the provisioning equipment server on the basis of the provisioning control data; and
a clock configured to provide a local time;
wherein the electronic provisioning token further comprises time adjustment information for adjusting the local time of the clock; and
wherein the processor is further configured to adjust the local time of the clock on the basis of the time adjustment information of the electronic provisioning token for obtaining an adjusted local time of the clock and to verify a provisioning control authorization of the electronic provisioning token using the adjusted local time of the clock.

2. The provisioning control apparatus of claim 1, wherein the processor is further configured to verify a time adjustment authorization of the electronic provisioning token and to adjust the local time of the clock on the basis of the time adjustment information of the electronic provisioning token for obtaining the local adjusted time, in case the time adjustment authorization of the electronic provisioning token has been successfully verified.

3. The provisioning control apparatus of claim 2, wherein the electronic provisioning token further comprises a digital signature and wherein the processor is configured to verify the time adjustment authorization of the electronic provisioning token by verifying the digital signature of the electronic provisioning token.

4. The provisioning control apparatus of claim 1, wherein the time adjustment information of the electronic provisioning token comprises a positive or negative time differential and wherein the processor is configured to adjust the local time of the clock for obtaining the adjusted local time of the clock by adding the positive or negative time differential to the local time of the clock.

5. The provisioning control apparatus of claim 1, wherein the time adjustment information of the electronic provisioning token comprises an electronic link or address information of a remote clock server providing a standard local time and wherein the processor is configured to obtain on the basis of the electronic link or address information the standard local time from the remote clock server for adjusting the local time of the clock so that the adjusted local time of the clock corresponds to the standard local time of the remote clock server.

6. The provisioning control apparatus of claim 5, wherein the electronic provisioning token further comprises a digital signature of the electronic link or address information of the remote clock server and wherein the processor is configured to verify the digital signature of the electronic link or address information of the remote clock server using a public key of the remote clock server or a public key of a token generator server.

7. The provisioning control apparatus of claim 1, wherein the communication interface is further configured to receive a time adjustment request from the provisioning equipment server, wherein the time adjustment request comprise a time adjustment differential, and wherein the processor is configured to adjust the local time of the clock on the basis of the time adjustment differential for obtaining the adjusted local time of the clock, if the absolute value of the time adjustment differential is smaller than a time differential threshold.

8. The provisioning control apparatus of claim 1, wherein the communication interface is further configured to receive a time synchronization message from the provisioning equipment server, wherein the time synchronization message comprises a time of the provisioning equipment server, and wherein the processor is configured to adjust the local time of the clock so that the adjusted local time of the clock corresponds to the time of the provisioning equipment server, in case the absolute value of the difference between the local time of the clock and the time of the provisioning equipment server is smaller than a time differential threshold.

9. The provisioning control apparatus of claim 7, wherein the time differential threshold is constant or wherein the time differential threshold is proportional to an elapsed time interval since a most recent adjustment of the local time of the clock.

10. The provisioning control apparatus of claim 1, wherein the electronic provisioning token further comprises data defining one or more validity time periods of the electronic provisioning token and wherein the processor is configured to control the transmission of the program code via the communication interface to the provisioning equipment server by prohibiting a transmission of the program code towards the provisioning equipment server, if the adjusted time of the clock is outside of the one or more validity time periods.

11. The provisioning control apparatus of claim 1, wherein the electronic provisioning token further comprises a provisioning counter, the provisioning counter indicating a total number of transmissions of the program code towards the provisioning equipment server, and wherein the processor is further configured to update a value of the provisioning counter for each transmission of the program code towards the provisioning equipment server to obtain an updated provisioning counter and to prohibit a further transmission of the program code towards the provisioning equipment server if the updated provisioning counter indicates that the total number of transmissions has been reached.

12. A provisioning control system comprising:
a provisioning control apparatus according claim 1;
a provisioning equipment server being electrically connectable with one or more electronic devices for provisioning the one or more electronic devices with a program code, wherein the provisioning control apparatus is coupled to the provisioning equipment server for controlling the provisioning of the one or more electronic devices; and
a token generator server configured to generate the electronic provisioning token.

13. The provisioning control system of claim 12, wherein the token generator server is configured to generate the electronic provisioning token in response to a token request from a remote server.

14. The provisioning control system of claim 13, wherein the token generator server is configured to verify a digital signature of the token request using a public key of the remote server, before providing the electronic provisioning token to the remote server.

15. The provisioning control system of claim 12, wherein the token generator server is configured to digitally sign the electronic provisioning token using a private key.

16. A method for controlling by a provisioning control apparatus the provisioning of one or more electronic devices with a program code by a provisioning equipment server, the provisioning equipment server being electrically connectable with the one or more electronic devices for provisioning the one or more electronic devices with the program code, wherein the method comprises:
receiving by the provisioning control apparatus an electronic provisioning token, wherein the electronic provisioning token comprises provisioning control data for controlling the provisioning of the one or more electronic devices with the program code and time adjustment information for adjusting a local time of a clock of the provisioning control apparatus;
adjusting the local time of the clock of the provisioning control apparatus on the basis of the time adjustment information of the electronic provisioning token for obtaining an adjusted local time of the clock; and
verifying a provisioning control authorization of the electronic provisioning token using the adjusted local time of the clock.

\* \* \* \* \*